United States Patent [19]

Walinsky

[11] Patent Number: 4,533,709
[45] Date of Patent: Aug. 6, 1985

[54] USE OF FUMARIC ACID POLYMERS AS ANTISCALANTS

[75] Inventor: Stanley W. Walinsky, Mystic, Conn.

[73] Assignee: Pfizer Inc., New York, N.Y.

[21] Appl. No.: 655,408

[22] Filed: Sep. 28, 1984

Related U.S. Application Data

[60] Continuation of Ser. No. 441,189, Nov. 12, 1982, Pat. No. 4,486,581, which is a division of Ser. No. 295,209, Aug. 24, 1981, abandoned, which is a continuation of Ser. No. 108,068, Dec. 28, 1979, abandoned.

[51] Int. Cl.$^3$ ............................................ C08F 222/16
[52] U.S. Cl. .................................. 526/318; 525/329.5
[58] Field of Search ............... 526/318, 321, 324, 325, 526/307.6, 307.7

[56] References Cited

U.S. PATENT DOCUMENTS

| Re. 27,151 | 6/1971 | Hicks | 526/318 |
| 3,617,577 | 11/1971 | King | 210/698 |
| 3,715,307 | 2/1973 | Johnson et al. | 210/701 |
| 3,810,834 | 5/1974 | Jones et al. | 210/698 |
| 3,923,752 | 12/1975 | Guse | 526/321 |
| 4,166,040 | 8/1979 | Goodman | 252/180 |
| 4,166,041 | 8/1979 | Goodman | 252/180 |

OTHER PUBLICATIONS

Chemical Abstracts 72: 133245s (1970).

*Primary Examiner*—Paul R. Michl
*Attorney, Agent, or Firm*—Charles J. Knuth; Peter C. Richardson; Harold W. Ordway

[57] ABSTRACT

Fumaric acid polymers may be used to control or inhibit scaling in boilers, desalination plants, steam generators, cooling equipment and the like. A novel process for their synthesis employs a mono or dialkyl ester of fumaric acid as a starting material.

8 Claims, No Drawings

USE OF FUMARIC ACID POLYMERS AS ANTISCALANTS

This is a continuation of application Ser. No. 441,189, filed Nov. 12, 1982, now U.S. Pat. No. 4,486,581, which is a division of application Ser. No. 295,209, filed Aug. 24, 1981, now abandoned, which is a continuation of application Ser. No. 108,068, filed Dec. 28, 1979, now abandoned.

BACKGROUND

This invention relates to the use of polymers of fumaric acid for the control or inhibition of the deposition of scale from water containing scale forming impurities, to processes for their synthesis and to polymeric intermediates of mono or dialkyl fumarate.

When natural waters and many man-made aqueous systems containing dissolved salts are used for distillation, heating or cooling purposes, the salts become insoluble and are deposited as scale on the heat transfer surfaces. The scaling, in turn, cuts down or destroys heat transfer and eventually causes failure of the equipment. In general, the mineral scale salts are derived from alkaline earth and other metal cations such as calcium, strontium, barium, magnesium, iron, lead and the like and anions such as bicarbonate, carbonate, sulfate, oxide, hydroxide, sulfide, phosphate, silicate, fluoride, chloride, bromide and the like. When deposited as scale, they appear in several forms or structures: adherent deposits formed directly on surfaces and non-adherent precipitated materials. Factors influencing scale formation include inverse temperature solubility of the various salts, the tendency of the salts to supersaturate and precipitate as the water is evaporated and the complex inorganic chemistry of the mineralized water, for example, its salt content, alkalinity, gegenion content and temperature among others.

A number of additives have been proposed as inhibitors of scaling. Among them are polycarboxylic acids, such as polyacrylic acid, polymaleic acid and polymethacrylic acid. Use of the carboxylic acid polymers in lower than the stoichiometric amount required to chelate the metallic ions present in the aqueous system has been shown to reduce effectively the tendency of the salts to deposit on heat transfer surfaces. This is termed the threshold effect and is accomplished in part by adsorption of the polymers onto the crystal nuclei as they are formed thereby suppressing further growth or adherence.

Accordingly, an object of the invention is to provide a method of inhibiting the deposition of scale on heat transfer surfaces such as those present in steam generators, desalination plants, cooling equipment, boilers and the like by use of an antiscaling agent in a threshold amount.

The polymerization of fumaric acid or its mixture with other monomers has been characterized as hard to achieve. Homopolymerization usually will not occur with any great facility and copolymerization incorporating more than 50 percent fumaric acid is difficult.

Accordingly, another object of the invention is to provide a process for the polymerization of fumaric acid and its admixtures with other monomers that is efficient, works in high yield and produces polymers of low to medium molecular weight.

The objects of the invention are met by use of novel polymers of fumaric acid which effectively inhibit scaling in such applications, by a novel method for their synthesis that employs esters of fumaric acid and by the polymeric intermediates of that synthesis.

SUMMARY

The method of the invention involves use of the fumaric acid polymers for control of the deposition of scale from water containing scale forming impurities. The method consists of treating the water with at least about 0.5 ppm of one of the polymers.

The polymers have an average molecular weight of from 300 to 10,000 and may be in the free acid or alkali metal, organic amine or ammonium salt form. They are selected from polyfumaric acid, a copolymer of fumaric acid and up to about 50 mole percent of at least one hydrophilic monomer, a copolymer of fumaric acid and up to about 15 mole percent of at least one ethylenically unsaturated, hydrophobic monomer, and a terpolymer of fumaric acid together with up to about 50 mole percent of at least one hydrophilic monomer and up to about 15 mole percent of at least one ethylenically unsaturated, hydrophobic monomer.

The hydrophilic monomer is selected from maleic anhydride, acrylic acid, methacrylic acid, acrylamide or methacrylamide.

Any ethylenically unsaturated monomer which exhibits hydrophobic properties may be used as the hydrophobic monomer of the polymers. Monomers preferred for this purpose include styrene, alpha methyl styrene, monoalkyl fumarate having 1 to 8 carbons in the alkyl group or dialkyl fumarate having 1 to 4 carbons in each of the alkyl groups, and 1-alkene having from 4 to 10 carbon atoms.

Also provided are ester polymer intermediates having an average molecular weight of from about 500 to about 15,000 and selected from poly (monoalkyl fumarate), a copolymer of monoalkyl fumarate and up to about 50 mole percent of at least one hydrophilic monomer, a copolymer of monoalkyl fumarate and up to about 15 mole percent of at least one ethylenically unsaturated, hydrophobic monomer, a copolymer of from 50 to about 85 mole percent dialkyl fumarate with from 15 to about 50 mole percent of at least one hydrophilic monomer, a copolymer of monoalkyl and dialkyl fumarate in any proportion, a terpolymer of monoalkyl fumarate together with up to about 50 mole percent of at least one hydrophilic monomer and up to about 15 mole percent of at least one ethylenically unsaturated, hydrophobic monomer and a terpolymer of from 50 to about 85 mole percent dialkyl fumarate together with from 15 to about 50 mole percent of at least one hydrophilic monomer and up to 15 mole percent of at least one ethylenically unsaturated, hydrophobic monomer. The monoalkyl fumarate may have from 1 to 8 carbons in the alkyl group and the dialkyl fumarate may have from 1 to 4 carbons in each of the alkyl groups.

The hydrophilic monomer is selected as above.

The hydrophobic monomer is selected from styrene, alpha methyl styrene or 1-alkene of from 4 to 10 carbons in length. Presence of an appropriate amount of mono or dialkyl fumarate in the intermediate and partial hydrolysis will provide a polymer of fumaric acid and inter alia mono or dialkyl fumarate. Moreover, the known methods for preparation of mono or dialkyl fumarate cause concurrent preparation of minor amounts of the other fumarate. Therefore, a polymer containing monoalkyl fumarate will contain a small amount of dialkyl fumarate. The reverse will also be true.

In the context of this specification, when the mole percent incorporation of a monomer into a polymer or polymeric intermediate is not specified, that monomer makes up the remaining balance of the polymer or intermediate.

Preferred methods of controlling scale deposition include use of polyfumaric acid, a polymer containing about 50 to about 98 mole percent fumaric acid, a copolymer of fumaric acid and about 2 to about 50 mole percent maleic anhydride, methacrylic acid or acrylamide, a copolymer of fumaric acid and about 2 to about 15 mole percent styrene, mono or dialkyl fumarate or 1-alkene, and a terpolymer of fumaric acid with about 2 to about 50 mole percent maleic anhydride, methacrylic acid or acrylamide and about 2 to about 15 mole percent mono or dialkyl fumarate or styrene.

The preferred intermediates of the invention include poly (monoalkyl fumarate), an intermediate containing about 50 to about 98 mole percent monoalkyl fumarate, and an intermediate wherein the hydrophilic monomer is maleic anhydride, acrylamide or methacrylic acid.

The fumaric acid polymers used in the invention are synthesized according to a novel process that obviates the inhibitory effect of fumaric acid upon free radical reactions and permits the high yield, facile formation of a polymeric intermediate containing fumaric ester. The hydrolysis conditions are particularly adapted toward converting the fumaric ester to the acid. The process is outlined below.

DETAILED DESCRIPTION

The synthesis of the fumaric acid polymers follows a novel process that avoids the insolubility and low reactivity of fumaric acid in free radical reactions and that produces the polymer in high yield. The interplay of temperature, time, solvent, nature of reactants and the free radical initiator are some additional, necessary features. The descriptions of the process of the invention that follow particularly point out these essential requirements and are arranged according to the categories of fumaric acid polymers given above.

Polyfumaric acid is prepared by hydrolysis of poly (monoalkyl fumarate) or poly (monoalkyl and dialkyl fumarate) which have been prepared respectively from monoalkyl fumarate having 1 to 8 carbons in the alkyl group or a mixture of the monoalkyl fumarate and dialkyl fumarate in any proportion. The fumarate monomer or monomers are polymerized in a neat melt (liquid) state with about 5 to about 15 mole percent of a free radical initiator such as benzoyl peroxide under an inert atmosphere at about 80° to about 130° for about 2 to about 10 hours or until polymerization is substantially complete. The resulting monoalkyl fumarate or mono and dialkyl fumarate polymeric intermediate may then be hydrolyzed with strong, aqueous mineral acid or base.

In general, the time and temperature parameters of the hydrolysis are inversely related. A higher temperature will require a shorter time. Moreover, as the alkyl chain length of the ester groups of the intermediate increases, the combination of time and temperature required will be higher. Typically, the hydrolysis is conducted at a temperature of at least 60° for at least 8 to 16 hours. At a temperature of 130°, achieved under pressure, the time required will be at least 15 to 45 minutes. In a preferred method, the resin is cooled, then mixed with aqueous alkali metal base and the mixture is warmed to achieve hydrolysis.

In general, a polymer of fumaric acid may be prepared by hydrolysis of the corresponding fumarate polymeric intermediate. The intermediate is first prepared by dissolving about 50 to 100 mole percent of the monoalkyl fumarate having 1 to 8 carbons in the alkyl group or about 50 to 85 mole percent of the dialkyl fumarate having 1 to 4 carbons in each of the alkyl groups, about 0 to about 50 mole percent of at least one hydrophilic monomer as defined above and about 0 to about 15 mole percent of at least one hydrophobic monomer as defined above, in a poor radical chain transfer solvent such as tetrahydrofuran, chlorobenzene, cyclohexane, toluene, or methyl ethyl ketone or by dissolving a mixture of monoalkyl fumarate and dialkyl fumarate in any proportion in a poor radical chain transfer solvent. This solution is placed under an inert atmosphere such as nitrogen and polymerized by adding about 5 to about 15 mole percent of a free radical initiator to the solution and refluxing for about 2 to about 18 hours or until polymerization is substantially complete. Hydrolysis of the intermediate with strong, aqueous mineral acid or base produces the polymer.

In general, the time and temperature parameters of the hydrolysis are inversely related. A higher temperature will require a shorter time. Moreover, as the alkyl chain length of the ester groups of the intermediate increases, the combination of time and temperature required will be higher. Typically the hydrolysis is conducted at a temperature of at least 60° for at least 8 to 16 hours to produce a polymer of fumaric acid. At a temperature of 130°, achieved under pressure, the time required will be at least 15 to 45 minutes. The hydrolysis may be accomplished without isolation of the intermediate by adding the aqueous acid or base to the polymerization solution and refluxing the two phase system. A preferred method will use alkali metal base.

To prepare an alkali metal, organic amine or ammonium salt of a polymer, the acidic form of the polymer is added to an aqueous solution of the corresponding base, i.e., alkali metal hydroxide, organic amine or ammonium hydroxide wherein the amount of base used is calculated to neutralize the desired number of carboxylic acid groups of the polymer. The solution is stirred until neutralization is complete, then the water is removed by freeze drying, distilling or other common technique to produce the salt. Alternatively the organic amine or ammonium salt may be formed in methanol or ethanol solution by substituting methanol or ethanol for water in the above procedure.

As the free acid or as the salt, the polymers may be stored and used as antiscalants in either dry form or as an aqueous solution. Any desired concentration of polymers in aqueous solution may be employed.

The ability of the polymers to srppress scale disposition on heat transfer surfaces is demonstrated by the scale inhibition test described below which is conducted in a single stage flash evaporator and approximates the conditions usually found in a desalination plant. Under actual field conditions, fouling and deposition occur most prevalently in the brine heater of the desalination plant. Accordingly, the excellent antiscalant activity of examples of the polymers against calcium and magnesium scale is reflected by the brine heater data of the antiscalant test.

The polymers may be used as the free acids or as the salts in the aqueous or dry forms. The method of use involves adding to the aqueous system containing scale forming impurities at least about 0.5 ppm of the polymer. This amount is sufficient to achieve the threshold effect necessary to suppress scale formation and prevent adherence to equipment surfaces. In more difficult scaling situations, higher levels of the polymer, e.g. 100 ppm or more may be desired. In a typical situation the operator will adjust the amount of polymer used in order to achieve the desired suppression of scale deposition. The methods of testing for scale and concentration of antiscalant are known to those familiar with the art. In practice, other ingredients customarily employed in boiler and cooling water and desalination applications can also be used with the antiscalant polymer.

In a typical desalination plant application, the polymer will be added as a concentrated, aqueous solution to the seawater. Its concentration in the seawater will be adjusted following the procedures above and the brine heater and flash chambers may be monitored for scale. When used dry, the polymer may be mixed with an appropriate amount of seawater or distillate to prepare a seawater-polymer solution. The solution may then be added to the seawater at such a rate as to maintain the desired seawater treatment concentration. Alternatively the dry polymer may be added directly to the seawater at such a rate as to maintain the desired concentration.

The invention is further illustrated by the following specific but not limiting examples. All temperatures are in degrees centigrade and where not specified are taken to be ambient temperature.

EXAMPLE A

Polyfumaric Acid

Polyfumaric acid is prepared by melting 0.1 mole of monomethyl, ethyl, butyl or hexyl fumarate, or a mixture in any proportion of any of these monoalkyl fumarates with dimethyl or diethyl fumarate, purging the melt with nitrogen and then slowly adding 10 mole percent benzoyl peroxide while stirring. The reaction mixture is maintained at 80°-95° for about 3.5 hours under nitrogen and then cooled to yield the ester intermediate. The intermediate may be hydrolyzed by adding an equal weight of concentrated hydrochloric acid to the reaction while hot. The hydrolysis mixture is refluxed for about 5 hours while continuously removing the appropriate alcohol by distillation. The polymer may be isolated by freeze drying the acidic solution, redissolving the polymer in a minimum amount of water and filtering. Polyfumaric acid prepared in this manner had an intrinsic viscosity of 0.057 in 0.1 M NaCl.

Polyfumaric acid may also be prepared by solution reaction. Any of the above monomers may be dissolved in tetrahydrofuran or other poor chain transfer solvent, the solution degassed with nitrogen and heated to reflux. About 10 mole percent benzoyl peroxide is added to the refluxing solution and the reaction continued for 4 to 8 hours. The intermediate ester is isolated and hydrolyzed as described in Example B to yield polyfumaric acid.

EXAMPLE B

Fumaric Acid Copolymers

A fumaric acid copolymer is prepared by dissolving 0.27 mole mono or dimethyl, ethyl or butyl fumarate and 0.27 mole of at least one hydrophilic monomer selected from acrylamide, methacrylamide, acrylic acid, methacrylic acid or maleic anhydride or by dissolving 0.27 mole of monomethyl, ethyl or butyl fumarate and 0.03 mole of at least one ethylenically unsaturated, hydrophobic monomer in tetrahydrofuran or cyclohexane and degassing the solution with nitrogen. The solution is heated to reflux and then 0.03 mole benzoyl peroxide is slowly added. After refluxing for 4 to 18 hours, the reaction mixture is cooled, the solvent removed in vacuo to yield the resinous ester intermediate. The crude resin is hydrolyzed by refluxing it in 5N hydrochloric acid to yield the fumaric acid copolymer.

EXAMPLE C

Fumaric Acid Terpolymers

Following the procedure of Preparation B, a fumaric acid terpolymer may be prepared by dissolving in any of the solvents indicated, 0.27 mole of the appropriate fumarate, 0.27 mole of at least one hydrophilic monomer selected as above and 0.06 mole of at least one ethylenically unsaturated hydrophobic monomer and carrying out the polymerization as described.

In Preparations B and C the mole amounts and identities of the monomers used may also be varied within the mole percent ranges and monomer identities of the invention. This will produce any of the desired ester intermediates and the fumaric acid co or terpolymers.

Antiscalant Test

The antiscalant properties of the fumaric acid polymers of the invention may be examined in a single stage flash evaporator which simulates desalination plant conditions. Scale deposition occurs in two parts of the evaporator, the brine heater and flask chamber, the most relevant with respect to prediction of fouling rates under field conditions being the brine heater scaling.

To test a polymer, 55 to 60 L. of authentic seawater containing the desired amount in ppm of the selected polymer is pumped through the evaporator while maintaining a recycle concentration factor of 1.5 [Cl] and a heater outlet temperature of 120°. After completion of the run, the evaporator is cooled and the brine heater and flask chamber are rinsed with dilute acid to remove deposited scale. Total scale is determined by atomic absorption spectroscopy or EDTA titration. A detailed description of the design, operation and test procedures of the single stage evaporator may be found in "The Proceedings of the International Congress on Desalination and Water Reuse", Nice, France, October 21-27, 1979.

Following this procedure polyfumaric acid of Example A above was tested to determine its ability to inhibit scale deposition. The results are given below in Table 1. For comparison purposes another antiscalant, polymaleic acid, was also tested. The amount of scale found is expressed as a percent of the total theoretical scale possible (millimolar basis). The lower the percent, the better the scale inhibition activity of the material tested.

TABLE 1

| Antiscalant Activity in the Single Stage Flash Evaporator | | |
|---|---|---|
| | % of theoretical Scale | |
| Material Tested (ppm)[1] | Brine Heater | Flash Chamber |
| Blank (no antiscalant) | 39.9 | 13.5 |
| Example A (4) | 0.44 | 3.15 |
| Commercial MA (4)+ | 1.65 | 3.78 |

TABLE 1-continued

Antiscalant Activity in the Single Stage Flash Evaporator

| Material Tested (ppm)[1] | % of theoretical Scale | |
|---|---|---|
| | Brine Heater | Flash Chamber |
| Commercial MA (4)* | 0.46 | 1.89 |

[1] concentration of test antiscalant in seawater in parts per million.
[+] commercial polymaleic acid (MA).
[*] commercial polymaleic acid (MA), identity of which is different from commercial MA[+].

I claim:

1. An intermediate polymer consisting of from about 50 to 100 mole percent monoalkyl fumarate, from 0 to about 50 mole percent of at least one hydrophilic monomer selected from acrylamide, methacrylamide, acrylic acid, methacrylic acid or maleic anhydride and from 0 to about 15 mole percent of at least one ethylenically unsaturated, hydrophobic monomer, the average molecular weight of the polymer being from about 500 to about 15,000 and the alkyl group of the monoalkyl fumarate being 1 to 8 carbons in length.

2. The intermediate polymer of claim 1 wherein the hydrophobic monomer is styrene, alpha methyl styrene, or 1-alkene of from 4 to 10 carbons in length.

3. Poly (monoalkyl fumarate) according to claim 1.

4. The intermediate polymer of claim 1 wherein the hydrophilic monomer is maleic anhydride, acrylamide or methacrylic acid.

5. A process for preparing polyfumaric acid, which comprises:
heating at a temperature of about 80° to about 130° for about 2 to about 10 hours, a mixture of monoalkyl fumarate and about 5 to about 15 mole percent of a free radical initiator, and
hydrolyzing the resulting poly (monoalkyl fumarate) with strong, aqueous mineral acid or base at a temperature of at least 60°.

6. The process of claim 5 wherein aqueous alkali metal hydroxide is used.

7. A process for preparing a polymer of fumaric acid with from 0 to about 50 mole percent of at least one hydrophilic monomer selected from acrylamide, methacrylamide, acrylic acid, methacrylic acid or maleic anhydride and from 0 to about 15 mole percent of at least one ethylenically unsaturated, hydrophobic monomer, the average molecular weight of the polymer being from about 300 to about 10,000, which comprises:
refluxing for about 2 to about 18 hours, a solution of from about 50 to 100 mole percent monoalkyl fumarate, 0 to about 50 mole percent of at least one hydrophilic monomer selected from acrylamide, methacrylamide, acrylic acid, methacrylic acid or maleic anhydride, 0 to about 15 mole percent of at least one ethylenically unsaturated, hydrophobic monomer, a poor radical chain transfer solvent and about 5 to about 15 mole percent of a free radical initiator, and
hydrolyzing the resulting intermediate polymer with strong, aqueous mineral acid or base at a temperature of at least 60°.

8. The process of claim 7 wherein alkali metal hydroxide is used.

* * * * *